UNITED STATES PATENT OFFICE.

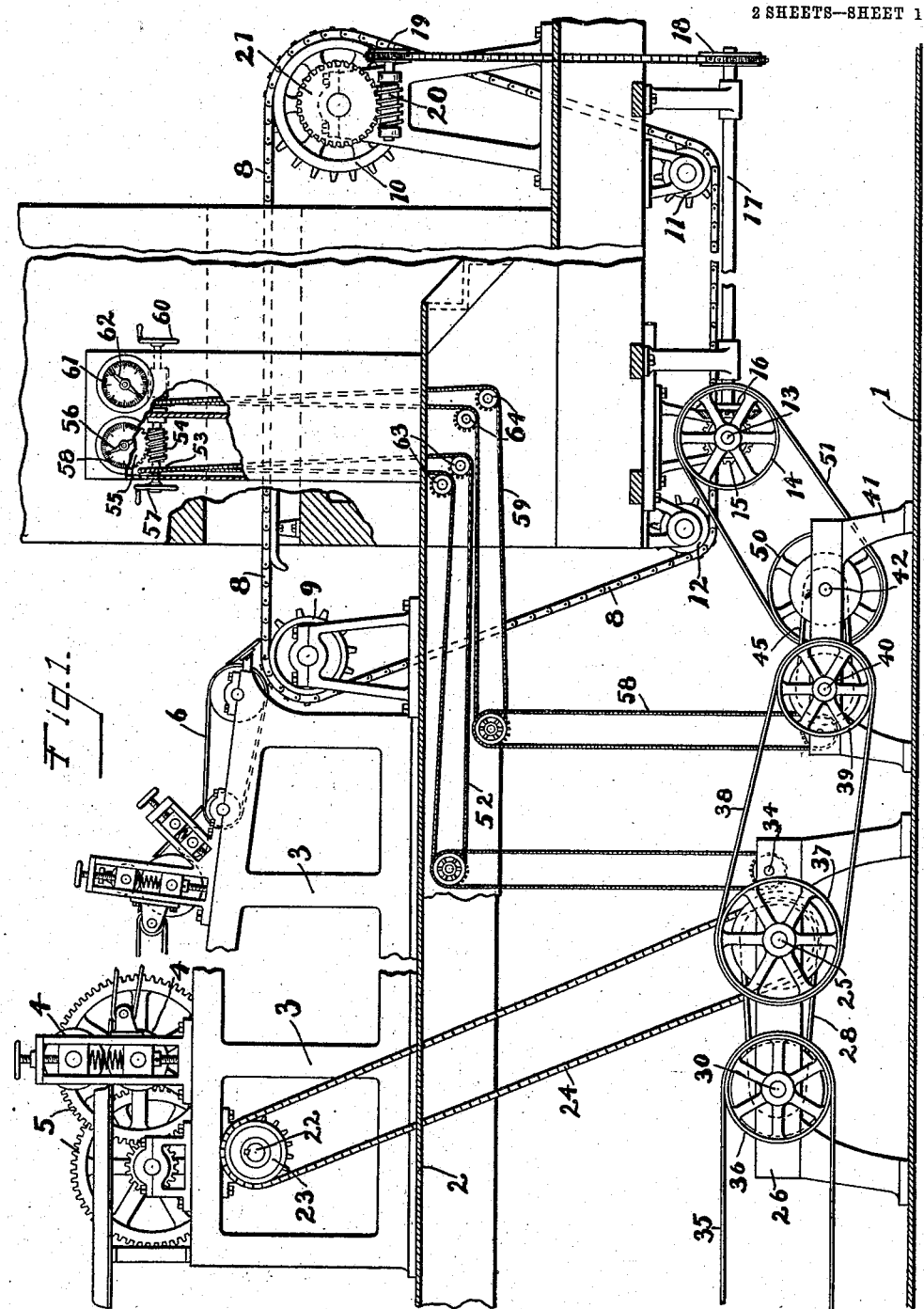

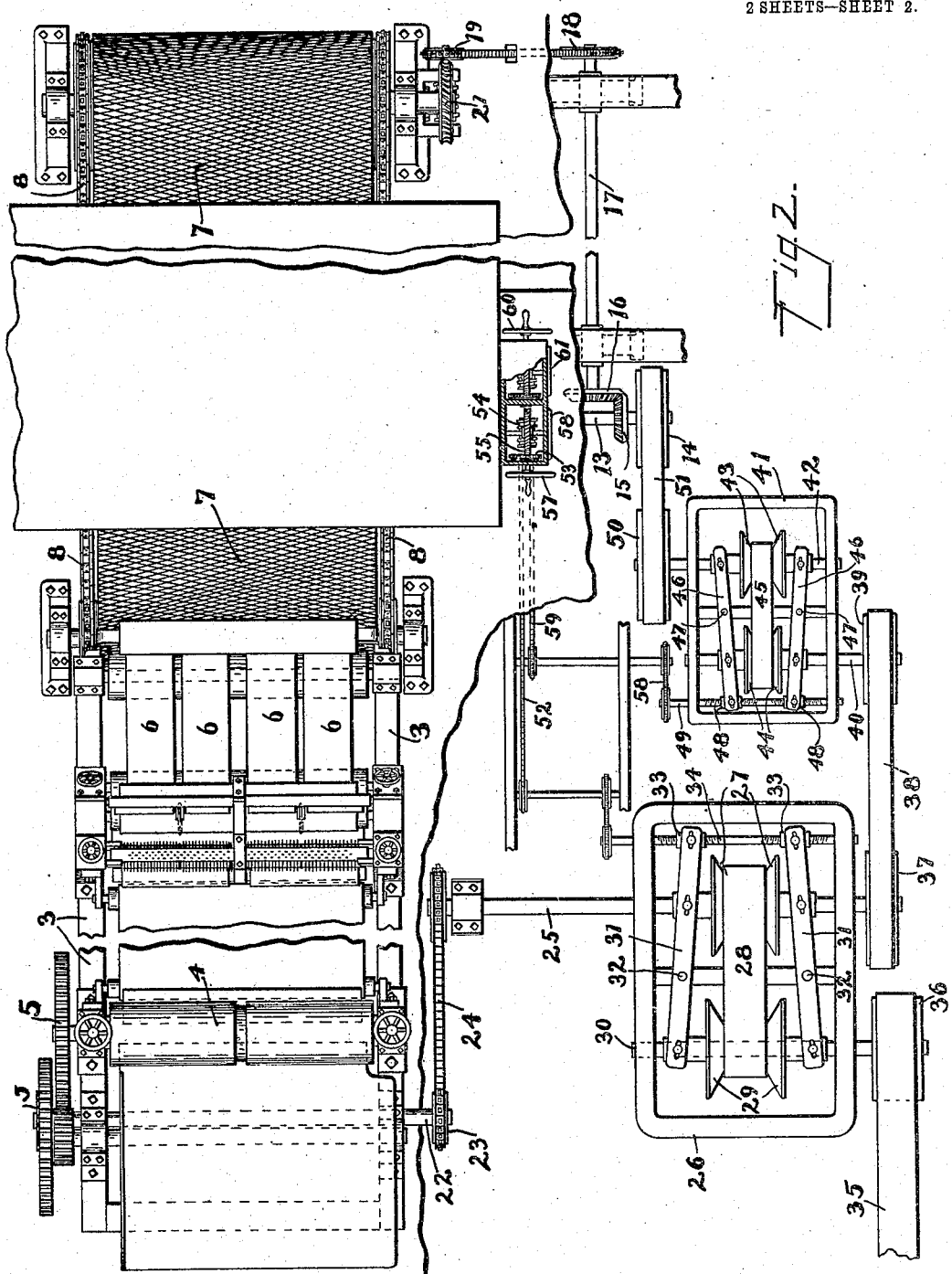

BEHR MANISCHEWITZ, OF CINCINNATI, OHIO.

MECHANISM FOR REGULATING THE SPEED BETWEEN TRAVELING CARRIERS.

No. 930,673.   Specification of Letters Patent.   Patented Aug. 10, 1909.

Application filed October 21, 1907. Serial No. 398,520.

*To all whom it may concern:*

Be it known that I, BEHR MANISCHEWITZ, a citizen of the United States, residing in the city of Cincinnati, in the county of Hamilton and State of Ohio, have invented certain new and useful Improvements in Mechanism for Regulating the Speed Between Traveling Carriers, of which the following is a full, clear, and exact description, reference being had to the accompanying drawings, forming part of this specification.

My invention has special relation to the regulation of the speed of traveling belts and the like, so that one belt can transfer its load to the other without disturbing in the least degree the position of the load, and my invention has particularly to do with the transfer of the cut dough for crackers, bakery goods, and the like, from the delivery apron of a cracker cutting machine to the traveling apron or carriage, by which the cut goods are carried through the oven to be baked.

It is usual in bakeries to transfer the dough—when cut into cakes by the cracker machine—to the carriage or apron, upon which the goods are transferred slowly through the oven to be baked, by means of a peel or board, upon which the operator slides the cracker material, and transfers it by hand to the oven apron. These ovens are sixty-five or seventy feet long, and the goods passing slowly through the oven are baked when delivered at the far end of the oven. If it were possible to drive by ordinary means, the oven carriage at the same rate of speed as the delivery apron of the cracker cutting machine, the goods would be transferred or delivered from the machine to the oven belt without manual interference, but it has been found impossible with the ordinary gearing to connect the two mechanisms, so that one will travel at exactly the same rate of speed as the other. As a result, when the two machines have been geared or otherwise connected, the oven belt is found to travel slightly slower, or slightly faster, than the delivery mechanism of the cracker machine, and the goods are either bunched on the apron, or spread too far apart. Any slight error in the equality of speed is greatly exaggerated owing to the length of the oven belt, so that it becomes impracticable to connect the two devices by any train of gearing or pulleys that will accomplish the result desired.

It is the purpose of my invention to overcome these difficulties, and to provide a construction in which exact equality of speed may be maintained between the two carriages by means of that certain novel construction to be hereinafter described and pointed out in the claim, the essential feature of which consists in coupling together a pair of variable speed devices, through one of which the speed of the cracker machine is regulated, and which variable speed device also drives a second variable speed device, through which the oven transfer mechanism is driven.

In the drawings Figure 1 is a side elevation of a portion of the cracker cutting machine, and a portion of the oven with its traveling belt, showing the two speed devices and the mechanism for connecting and regulating the speed thereof. Fig. 2 is a plan view of the apparatus shown in Fig. 1.

For convenience of operation, the connecting mechanism and the variable speed devices are located on the floor 1, being the floor below the floor 2, upon which the cracker machine and oven are located, and for convenience of illustration, the speed devices are not illustrated directly under the cracker machine, while in practical operation, it is found convenient to locate the various mechanisms directly under each other.

As the invention relates more particularly to the coupling together of the several variable speed devices, the particular construction of cracker cutting machine, or oven, and the particular construction of the variable speed devices, is not of particular consequence, I have not illustrated in the drawings any details of these various parts.

In the drawings 3 illustrates the side standards of any construction of cracker machine, with its rolls 4—4 and train of gears 5—5, and with a delivery apron 6, upon which the crackers are delivered from the machine. Located immediately under the delivery end of the machine, is the traveling wire frame or apron 7, provided with sprocket chains 8—8 on each edge, which comprises an endless apron carried by the sprocket wheels 9, 10, 11 and 12. It will be understood that the sprocket wheels 9 and 10 are some sixty-five or seventy feet apart. The driving mechanism which I have provided for driving this endless oven, consists of the driving shaft 13, with a driving pulley 14, which shaft 13 carries the beveled gear 15 meshing with the beveled gear 16 on the counter-shaft 17, which carries the sprocket wheel 18, driving by sprocket wheel 19 the worm gear 20, which meshes with the gear 21 on the shaft of the sprocket wheel 10.

For the cracker machine 22 is the driving shaft which carries the sprocket wheel 23 driven by the sprocket chain 24. This sprocket chain 24 is driven by the sprocket shaft 25, which is connected with any desired construction of variable speed device. The one I have illustrated is of ordinary construction, and comprises a framework 26, in which the shaft 25 is journaled, and this shaft carries one pair of coned spools 27—27, with the belt 28 therefor running over a second pair of coned spools 29—29, mounted on the shaft 30 journaled in the frame. Both pairs of coned spools slide on feathered shaft keys, and these coned spools are expanded or contracted by a pair of levers 31—31 fulcrumed centrally at 32—32 between the two shafts 25 and 30, and connected to the spool hubs. The operating ends of these levers 31 are pivoted on nuts 33—33 on the right and left hand screw 34, also journaled in the frame, so that the rotation of the screw 34 will expand and contract the sliding spools to maintain the proper belt tension at the same time that the rate of speed transmission between the shaft 30 and the shaft 25 is varied. The shaft 30 is driven by the belt 35 and pulley 36 on the shaft 30 from any suitable power. Mounted on the shaft 25 is the pulley 37, which drives by belt 38 the pulley 39 on the shaft 40, which is journaled in a second variable speed device frame 41. This second variable speed device is a counterpart of the one just described. The shafts 40 and 42 carry the coned spools 43—44 with key and feather for the spools to permit them to slide on these shafts. 45 is the connecting belt, 46—46 the operating levers for the spools fulcrumed at 47—47, and the outer ends of these levers are pivoted to the nuts 48—48 on the right and left screw threaded shaft 49, so that the rotation of the shaft 49 will adjust the cones to vary the transmission speed in the shafts 40 and 42. The shaft 42 carries the pulley 50, over which runs the belt 51, by which the driving pulley 14 for the oven traveling belt is operated. For regulating the speed of these two variable speed devices, I connect by sprocket wheels and chains 51—52 the screw shaft 34 with the sprocket 53, coupled to the worm 54, which engages the gear 55, operating the dial indicator 56. This worm 54 is actuated by the hand crank 57, so that the train of sprocket chains and wheels may be turned to rotate the shaft 34, and thus vary the speed of the driving mechanism of the cracker machine, the dial 58 and pointer 56 indicating the speed. In the same way the right and left screw shaft 49 is rotated by the train of sprocket wheels and chains 58—59, and for this operating device, 60 is the hand crank, 61 the dial, and 62 the pointer. In the transmission of the rotation of these hand dials in each case idler sprockets 63—63 and 64—64 are employed.

In making use of the devices above described, the variable device for the cracker machine is set to obtain any desired speed for the apron 6, and the delivery of the cut cracker dough from the machine. The cracker machine is then started, and with the hand crank 60, the operator regulates the speed of travel for the oven belt 8, so that the oven belt will travel at the exact speed delivery of the cracker machine. Then, as the necessity of the case may require, according to the heat of the oven and the character of the fire, the operator regulates the speed through the oven by the hand crank 57, which as will be understood, alters the speed of the cracker machine.

It is essential to have the two speed devices, the speed device for the cracker machine driving the speed device for the oven machine, in order that the speed delivery of the two machines may be regulated exactly, but when once regulated, except for lost motion, and wear, etc., the oven speed device does not need to be touched, and the operator simply regulates the oven speed by varying the speed of the cracker machine.

Having thus described my invention, what I claim as new, and desire to secure by Letters Patent, is:—

In a mechanism of the class described, the combination with a cracker machine for cutting dough for bakery goods provided with a delivery apron to deliver the cut material from the machine, and an independent oven conveyer comprising an endless traveling frame for carrying the goods through the oven of a variable speed device for regulating the speed of the delivery apron, and a second variable speed device for regulating the speed of the oven conveyer, intermediate mechanism connecting the two speed devices, means for driving the delivery apron variable speed device, and independent mechanism for regulating the speed of each of the two speed devices.

BEHR MANISCHEWITZ.

Witnesses:
 BESSIE BEALL,
 LAURETTA LINDSAY.